May 23, 1950

E. MÜHLEMANN 2,509,043

BEARING SURFACE FOR BREECH BOLTS
IN AUTOMATIC FIREARMS

Filed Jan. 21, 1947

Inventor
E. Muhlemann

By
Attorneys

Patented May 23, 1950

2,509,043

UNITED STATES PATENT OFFICE 2,509,043

BEARING SURFACE FOR BREECH BOLTS IN AUTOMATIC FIREARMS

Ernst Mühlemann, Zurich-Oerlikon, Switzerland, assignor to Verwaltungsgesellschaft der Werkzeugmaschinenfabrik Oerlikon, Zurich-Oerlikon, Switzerland, a Swiss company Application January 21, 1947, Serial No. 723,443
In Switzerland January 24, 1946

2 Claims. (Cl. 89—190)

In the manufacture of firearms it is a known principle to bring the locking members to bear on self-releasing surfaces. It is essential and a matter of course that the locking member should be secured by special means, and that the self-releasing surfaces should only be able to slide out of contact, with consequent unlocking of the breech block, when these special securing means are removed.

It is, however, a well-known fact that the members bearing against each other by means of self-releasing surfaces have to move relatively each to the other in order to make it possible for the surfaces to slide out of engagement.

It is inherent in this movement that the self-releasing, plane bearing surfaces only remain in partial contact during the process of opening, which results in the contact occurring through only one edge of one or other of the parts. As, however, the forces being exerted are still considerable, it is inevitable that at least one of the self-releasing surfaces becomes damaged in the course of time, with the result that the essential, precise contact of the said parts in the locked position is no longer assured.

The object of the present invention is to provide bearing surfaces for the breech bolts of automatic firearms in which, in the known manner, the inclination of the bearing surfaces to the pivotal axis of the bolt is such that the force exerted on the breech-bolt bearing surfaces exercises a force on the bolt which overcomes the frictional resistance to opening, measures being taken to ensure that during the opening motion of the bolt the contact between the surfaces still bearing against each other remains practically complete.

In accordance with the invention this result is obtained by designing the breech-bolt bearing surfaces as portions of the surface of a cylinder whose axis lies parallel to the pivotal axis of the bolt and in a plane passing through the pivotal point of the bolt and deviating, when the breech block is locked, in the direction of the bearing surface from a plane erected vertically on the breech slide and passing through the pivotal point of the bolt, by an angle amounting to as much as half the angle of pivot of the bolt.

In the annexed drawing Figs. 1 and 3 to 7 show a typical embodiment of the invention, in which—

Figure 1:
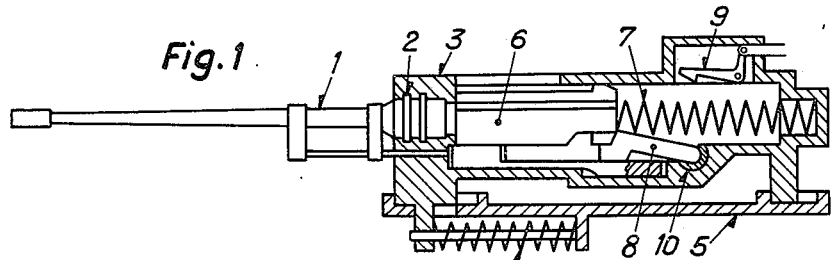
Fig. 1 is a section through an automatic firearm, shown diagrammatically.

In Fig. 1 the barrel 1 is inserted in the breech-sleeve 3 in the known manner by means of a bayonet joint 2. The breech sleeve 3 slides, counter to the spring 4, on a cradle 5. The breech block 6 is acted upon by a tension spring 7. The breech block 6 is held by the bolt 8, the bolt operating mechanism, not being essential to the invention, having been omitted. 9 is a diagrammatic representation of the trigger mechanism. The bolt 8 is located in a cup 10 fitted in the breech sleeve 3.

In Figs. 2 to 5 various positions of the bolt are shown, up to and including that in which the two bearing surfaces are completely disengaged. The bolt 8 bears, through the surface 11, against the surface 12 of the breech block 6; these surfaces are required to be self-releasing.

Figure 2:
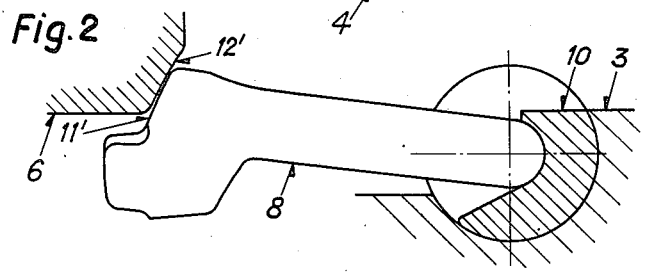
Fig. 2 is a bolt having plane, self-releasing bearing surfaces.
Figure 3:
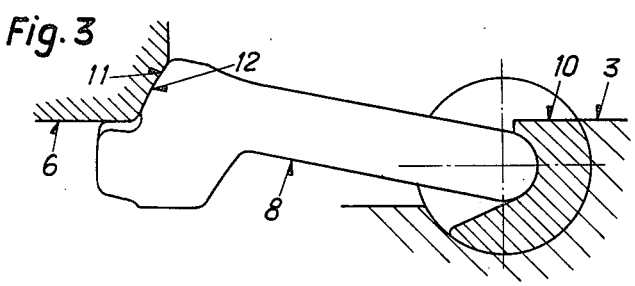
Figs. 3 to 5 show various positions of a bolt in accordance with the present invention.
Figure 4:
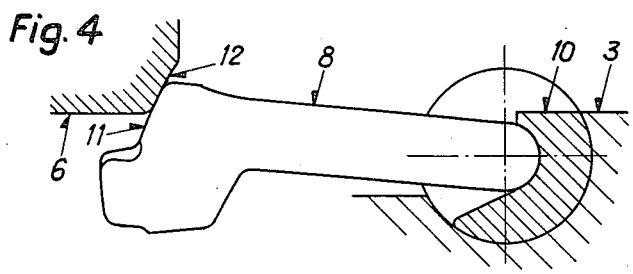
Figure 5:
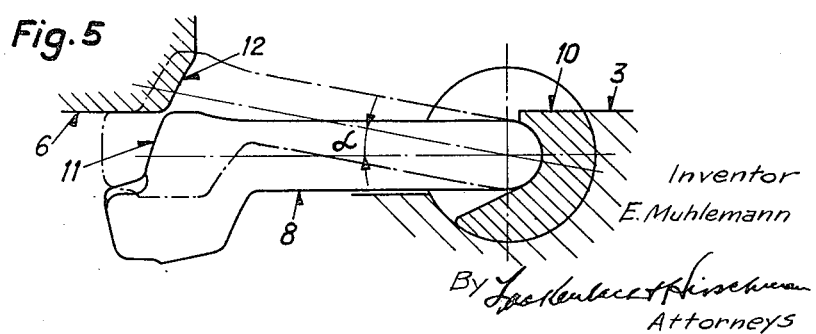

In Figs. 3 to 5 the bearing surfaces 11 and 12 are shaped in accordance with the present invention, whereas in Fig. 2 self-releasing, plane surfaces 11' and 12' of the usual design are provided. As is shown by Fig. 2, even when the opening process has only progressed to a slight degree, bearing surfaces 11' and 12' only bear against each other over a small proportion of their area, so that the damage referred to in the preamble hereto is unavoidable.

Figs. 3 to 5, on the other hand, show how, with the surfaces 11 and 12 designed in accordance with the present invention, the surfaces continue to bear against each other almost perfectly until the two bearing surfaces are completely disengaged.

Figure 6:
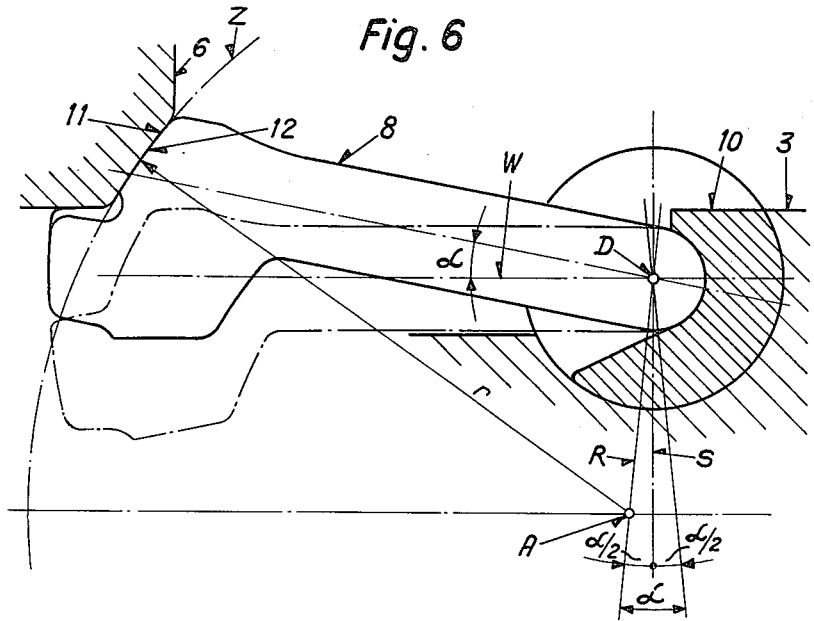
Figs. 6 and 7 show two geometrical representations enabling the central points to be ascertained which form the basis for shaping the self-releasing surfaces.
Figure 7:
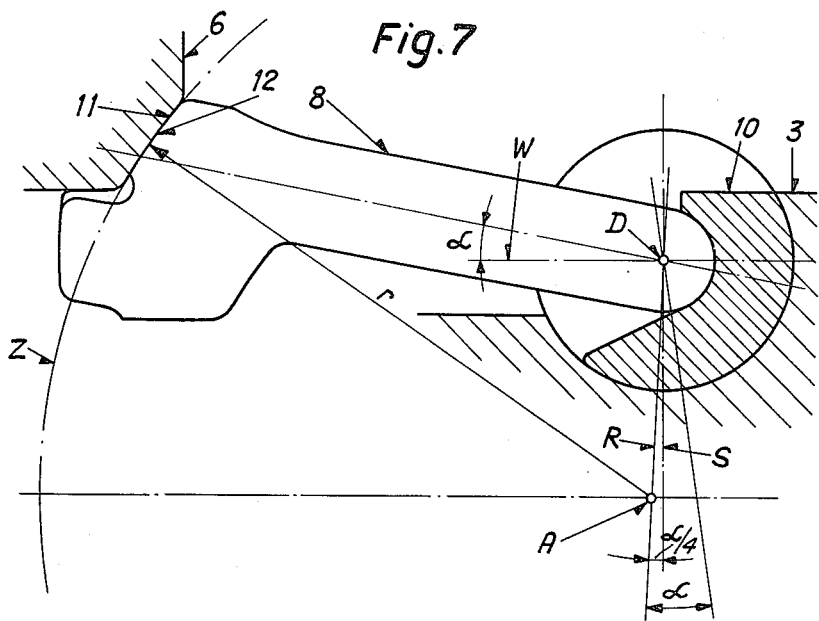

In Figs. 6 and 7 the method is illustrated by which the central point or axis A of the cylinder Z, of which the bearing surfaces 11 and 12 are parts, is found. On a plane W passing through the pivotal point of the bolt and parallel to the axis of the firearm, a vertical plane S is erected. The bolt 8 will, during the opening motion, have to pass through a certain angle until the two surfaces 11 and 12 are completely disengaged, which angle is represented by $a$. On the plane S angles are taken on each side, each having half the value of $a$, and a new plane is laid which deviates from plane S by an angle not exceeding $a/2$, but which may be, for instance $a/4$, as shown in Fig. 7, this deviation taking place on the side directed towards the bearing surface 12. In this plane R lies the axis A of the cylinder Z, according to which the bearing surfaces 11 and 12 are to be laid down. r is the radius of the cylinder Z from the axis A.

The position of the axis A of the cylinder Z, according to which the bearing surfaces 11 and 12 are to be laid down, depends on the angle of inclination selected for the bearing surfaces 11 and 12; in other words, the axis A will, according to the force selected to be exerted for the self-releasing motion, be further from or nearer to the pivotal point D of the bolt. In any case the distance between the axis A of the cylinder and the pivotal point D of the bolt must be such as to ensure that the force exerted on the breech bolt bearing surface 12 and passing through the axis A of the cylinder exerts a force on the bolt 8 sufficient to overcome the frictional resistance to opening, since only then will the self-release of the bearing surfaces 11 and 12 be possible.

By the formation of the bearing surfaces 11 and 12 in the manner shown, all drawbacks, referred to in the preamble and depicted in Fig. 2, of the known type of plane bearing surfaces 11' and 12', are obviated in a simple manner.

I claim:

1. In an automatic firearm, the combination of a breech block and a self-releasing pivoted breech bolt engageable with the block for holding the same in firing position and adapted itself to be locked in such holding position, said breech block and bolt having mutually engaging bearing surfaces whose angle of inclination to the pivotal axis of the bolt is such that the force exerted on the breech bolt bearing surfaces exerts a force on the bolt exceeding the frictional resistance to opening, said breech block and bolt bearing surfaces being formed as part of the surface of a cylinder whose axis lies parallel to the pivotal axis of the bolt and on a plane which passes through the pivotal axis of the bolt and deviates, when the breech block is locked, by an angle amounting to not more than half the angle of pivot of the bolt and on the side directed towards the bearing surfaces, from a plane erected vertically on the breech slide and passing through the pivotal axis of the bolt, the distance between the cylinder axis and the pivotal axis of the bolt being sufficient to allow the self-release of the bearing surfaces, whereby on unlocking of the breech bolt and consequent self-release of the block and bolt, substantially continuous cylindrical surface contact is maintained between the bearing surfaces of the block and bolt until they are out of overlapping relation.

2. In an automatic firearm, the combination of a breech block and a self-releasing pivoted breech bolt engageable with the breech block for holding the same in firing position and adapted itself to be locked in such holding position, said breech block and bolt having mutually engaging bearing surfaces sufficiently inclined to the direction of travel of the breech block to cause disengagement between said surfaces on release of the breech bolt, both of said surfaces forming part of a cylindrical surface whose axis is so located that said bearing surfaces, on release of the bolt, maintain substantially continuous surface contact until they are out of overlapping relation.

ERNST MÜHLEMANN.

REFERENCES CITED

The following references are of record in the file of this patent:

UNITED STATES PATENTS

| Number | Name | Date |
|---|---|---|
| 591,525 | Burgess | Oct. 12, 1898 |

FOREIGN PATENTS

| Number | Country | Date |
|---|---|---|
| 100,268 | Germany | Dec. 20, 1898 |
| 641,356 | Germany | Jan. 28, 1937 |
| 706,158 | Germany | May 19, 1941 |